(No Model.)
J. TRUMPY.
STORAGE BATTERY SYSTEM.
No. 519,077. Patented May 1, 1894.
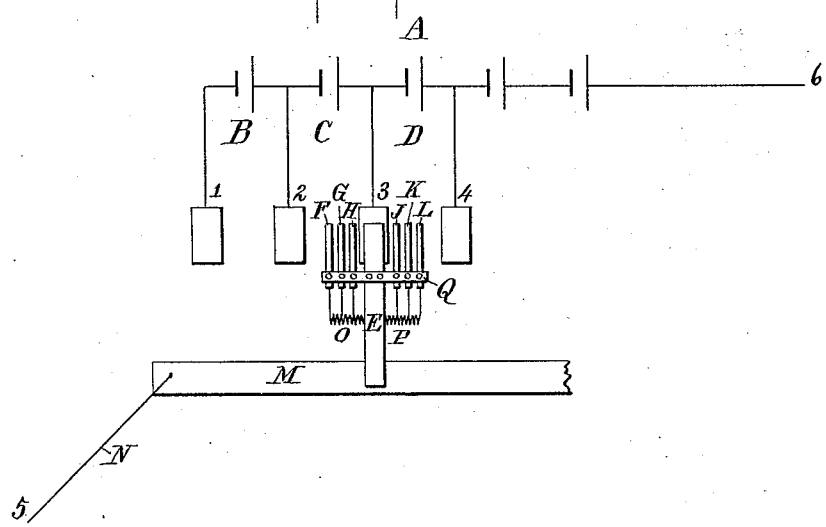
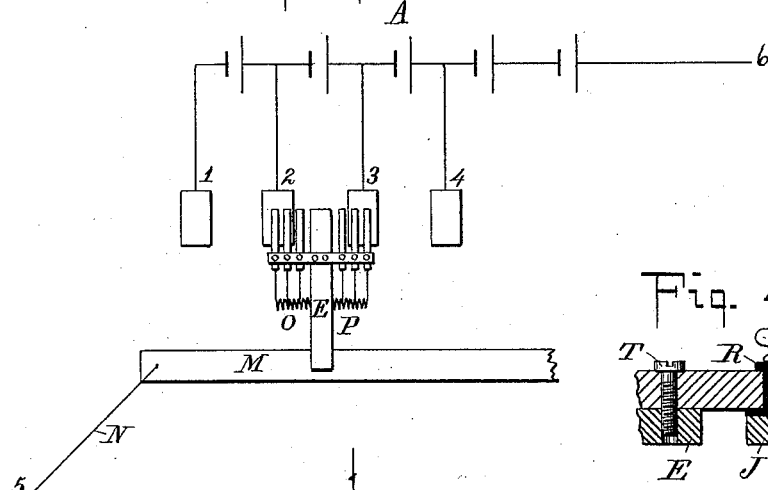
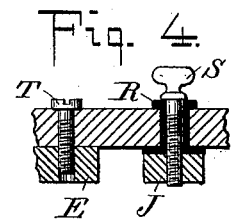
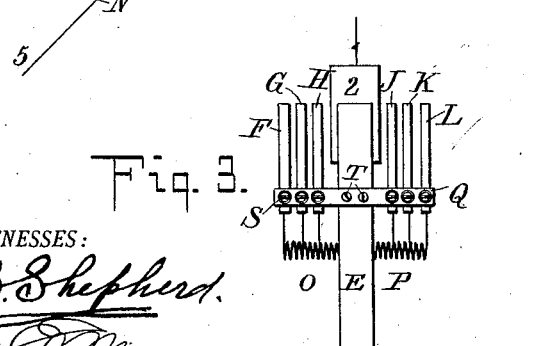
WITNESSES:
INVENTOR
Jakob Trumpy
BY Briesen J Knauth
ATTORNEYS.

UNITED STATES PATENT OFFICE.

JAKOB TRUMPY, OF HAGEN, GERMANY.

STORAGE-BATTERY SYSTEM.

SPECIFICATION forming part of Letters Patent No. 519,077, dated May 1, 1894.

Application filed November 22, 1893. Serial No. 491,622. (No model.) Patented in Germany May 15, 1892, No. 68,017.

*To all whom it may concern:*

Be it known that I, JAKOB TRUMPY, a resident of Hagen, Westphalia, Germany, have invented certain new and useful Improvements in Storage-Battery Systems, (for which I have obtained Letters Patent in Germany, numbered 68,017 and dated May 15, 1892,) of which the following is a specification.

My invention relates to storage battery systems, and has for its object to avoid sudden variations of tension in the circuit when the cells are switched in and out, and to thereby avoid the destructive effects of sparking at the brushes of the circuit changing switch.

To this end my invention consists in providing auxiliary brushes at one or both sides of the main brush, and connecting these auxiliary brushes with each other and to the main brush by suitable resistances as will be hereinafter more fully set forth.

I attain the object of my invention by means of the mechanism set forth herein and illustrated in the accompanying drawings, in which—

Figure 1 is a diagrammatic view of a storage battery system showing my improvement applied thereto. Fig. 2 is a similar view with the circuit changing switch in a different position. Fig. 3 is an enlarged view of a form of circuit changing switch made according to my invention; and Fig. 4 is a sectional detail view of a portion thereof.

In the drawings A represents a series of storage batteries B C D connected together and at intervals to a series of contact plates 1, 2, 3, 4. The battery circuit terminals from which current is taken off to the translating devices are at 5 and 6. The circuit terminal 5 is connected by a wire N with the circuit closing rail M. Bridging across from the rail M to the contact plates 1, 2, 3, 4, is a movable circuit changing switch consisting of a main brush E with auxiliary brushes F, G, H, J, K, L, on each side of the main brush connected together and to the main brush E by resistances O, P. These brushes F, G, H, J, K, L, may be supported adjacent to the main brush E in any suitable manner, but I prefer to support them on each side of the main brush by means of a cross-bar Q secured to the brush E by screws T. Screws S and insulation R serve to support the auxiliary brushes and to insulate them from the main brush as is more clearly shown in Figs. 3 and 4. In the normal operation of the system the circuit is completed from a contact plate (as 3, Fig. 1) to the rail M, by the main brush E. If, now, it is desired to include the cell C in circuit, the circuit changing switch is moved to the left. As the main brush passes off the contact plate 3, one or more of the auxiliary brushes J, K, L, contact with said plate 3 and the course of the current is through these brushes and the resistance P, to and through the main brush E to the rail M, and the main circuit. As the circuit changing switch continues to move, one or more, of the auxiliary brushes F, G, H, will contact with the plate 2 before all of the brushes J, K, L, have passed off the plate 3. The cell C will now be shunted through the resistance O, P, brush E, and the auxiliary brushes on each side of the main brush between the plates 2 and 3, as shown in Fig. 2. The main current will, however, still pass through the auxiliary brushes to the right of the main brush and through the resistance P, and brush E, to the rail M. As the circuit changing switch continues to move, the auxiliary brushes to the right of the main brush will move off the plate 3 and the auxiliary brushes to the left of the main brush will move off the plate 3. The main brush E will, however, contact with the plate 2 before the last of the auxiliary brushes F, G, H, have passed off the plate. When the parts are in the position of Fig. 3, the movement of the circuit changing switch is stopped. It will thus be seen that in order to cut in an additional cell the cell is first shunted through the resistances, and then included in the main circuit, the main circuit being maintained continuous at all times. In order to cut out a cell, the circuit changing switch is moved in the opposite direction and the operation thus reversed.

It will be evident that since the high potential main circuit is never broken, there will be no destructive sparking during the operation of the apparatus.

The connections O, P, are of high enough resistance to prevent any great amount of current passing when a cell is connected through them, as shown in Fig. 2, for if O, P, were of very low resistance, the included cell would be short circuited and sparking would result.

I do not limit myself to the exact construction and arrangement of the devices herein shown as they may be greatly varied without departing from the spirit of my invention.

What I claim, and desire to secure by Letters Patent, is—

1. In a storage battery system, the combination of a series of cells connected with each other and at intervals to a series of contact plates, with a circuit-changing switch consisting of a main brush and a series of smaller auxiliary brushes carried by the main brush on each side thereof and connected with each other and to the main brush by resistances, whereby during switching the tension at the main brush is changed by degrees corresponding to the number of side brushes, substantially as described.

2. In a circuit-changing switch, the combination of a main brush, with a series of smaller auxiliary brushes carried thereby and connected with each other and to the main brush by resistances, substantially as described.

JAKOB TRUMPY.

Witnesses:
WM. ESSENWEIN,
F. H. STRAUSS.